US009393718B2

(12) United States Patent
Numata et al.

(10) Patent No.: US 9,393,718 B2
(45) Date of Patent: *Jul. 19, 2016

(54) METHOD OF FORMING SINGLE-MODE POLYMER WAVEGUIDE ARRAY ASSEMBLY

(71) Applicant: INTERNATIONAL BUSINESS MACHINES CORPORATION, Armonk, NY (US)

(72) Inventors: Hidetoshi Numata, Kawasaki (JP); Yoichi Taira, Kawasaki (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/714,824

(22) Filed: May 18, 2015

(65) Prior Publication Data
US 2015/0266248 A1    Sep. 24, 2015

Related U.S. Application Data

(63) Continuation of application No. 13/953,336, filed on Jul. 29, 2013, now Pat. No. 9,061,473.

(30) Foreign Application Priority Data

Jul. 31, 2012    (JP) .................................. 2012-169657

(51) Int. Cl.
*B29D 11/00*    (2006.01)
*B29C 33/12*    (2006.01)
(Continued)

(52) U.S. Cl.
CPC ............... *B29C 33/12* (2013.01); *B29C 33/424* (2013.01); *B29D 11/00663* (2013.01); *B29D 11/00673* (2013.01); *B29D 11/00721* (2013.01);
(Continued)

(58) Field of Classification Search
CPC ................... B29D 11/00721; B29D 11/00884; B29C 33/424; B29C 33/14; G02B 6/10
USPC ............... 264/1.24, 1.25, 1.38, 2.1, 494, 310, 264/311, 334, 308; 427/508, 512, 163.2; 249/91
See application file for complete search history.

(56) References Cited

U.S. PATENT DOCUMENTS 6,227,722 B1 *   5/2001  Kropp .................. G02B 6/4249
                                                    385/14
6,500,603 B1 * 12/2002  Shioda .................. G02B 6/138
                                                    264/1.24

FOREIGN PATENT DOCUMENTS

JP        08-110433      4/1996
JP      2000-075166      3/2000
(Continued)

*Primary Examiner* — Alison L Hindenlang
*Assistant Examiner* — Lawrence D Hohenbrink, Jr.
(74) *Attorney, Agent, or Firm* — Tutunjian & Bitetto, P.C.

(57) ABSTRACT

High accuracy positioning relative to an absolute reference position (guide pin holes in ferrules, etc.) is provided for a plurality of cores constituting a polymer waveguide array for connection to ferrules at ends of a plurality of these assemblies to form a single-mode polymer waveguide array assembly. A method for forming a single-mode polymer waveguide array assembly enables a plurality of cores constituting a polymer waveguide array to be positioned with high accuracy. Also provided is a combination of process molds (an initial process mold and intermediate process mold) used in the processes unique to the present methods.

10 Claims, 9 Drawing Sheets

(51) Int. Cl.
    *B29C 33/42* (2006.01)
    *G02B 6/38* (2006.01)
    *G02B 6/122* (2006.01)
    *G02B 6/138* (2006.01)
    G02B 6/10 (2006.01)
    B29C 33/14 (2006.01)
    B29K 105/24 (2006.01)

(52) U.S. Cl.
    CPC .............. *G02B6/1221* (2013.01); *G02B 6/138* (2013.01); *G02B 6/3885* (2013.01); *B29C 33/14* (2013.01); *B29D 11/00884* (2013.01); *B29K 2105/24* (2013.01); *G02B 6/10* (2013.01)

(56) References Cited

FOREIGN PATENT DOCUMENTS

| | | |
|---|---|---|
| JP | 2004-133300 | 4/2004 |
| JP | 2005-201937 | 7/2005 |
| JP | 2008-083205 | 4/2008 |
| JP | 2008-089879 | 4/2008 |

\* cited by examiner

FIG. 2
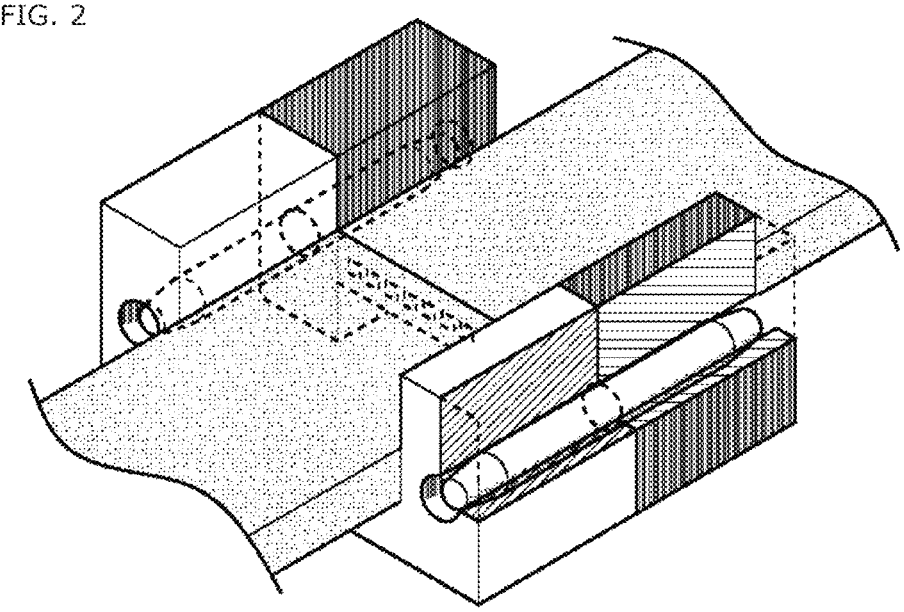
(A)
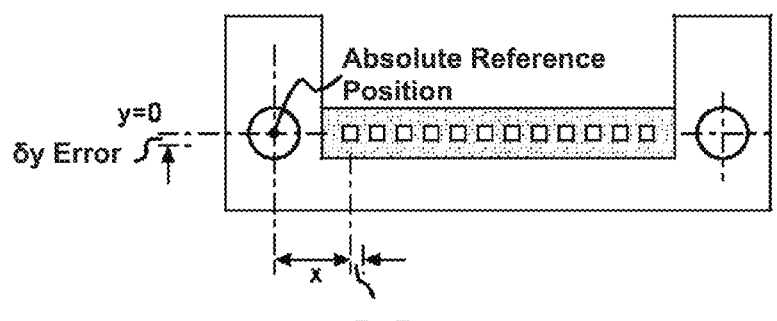
(B)
Desired Positioning Accuracy For Polymer Waveguide For Single-Mode Light
δx < 0.5μm ~ 1.0μm
δy < 0.5μm ~ 1.0μm FIG. 6
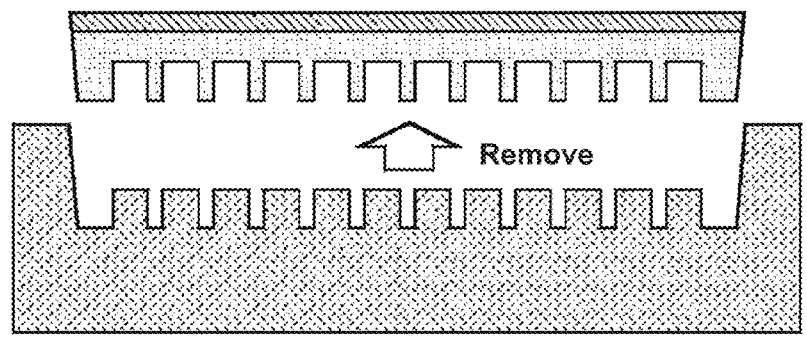
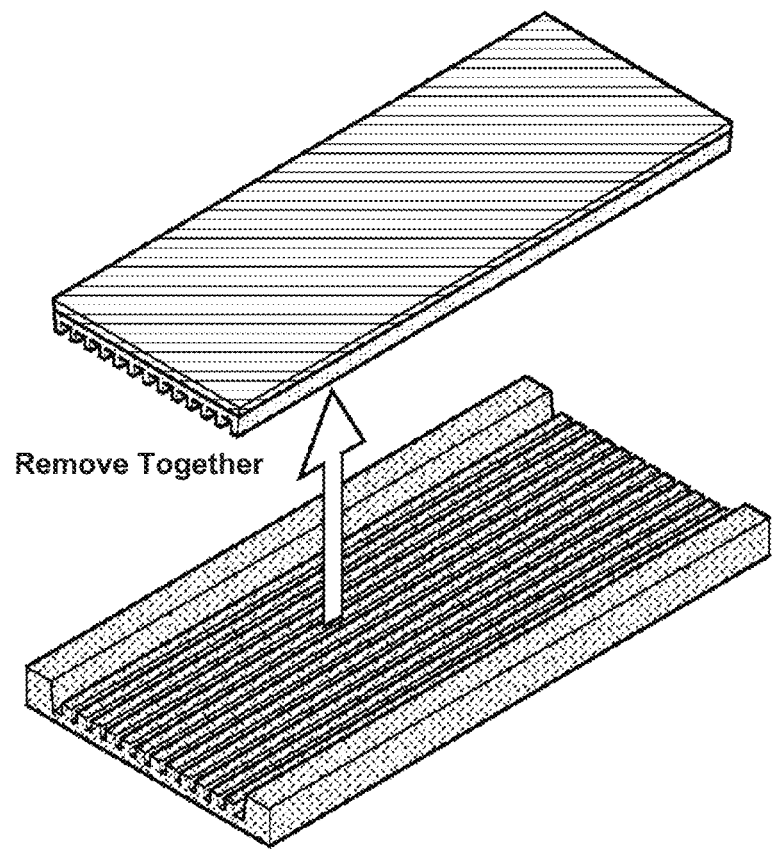

FIG. 7
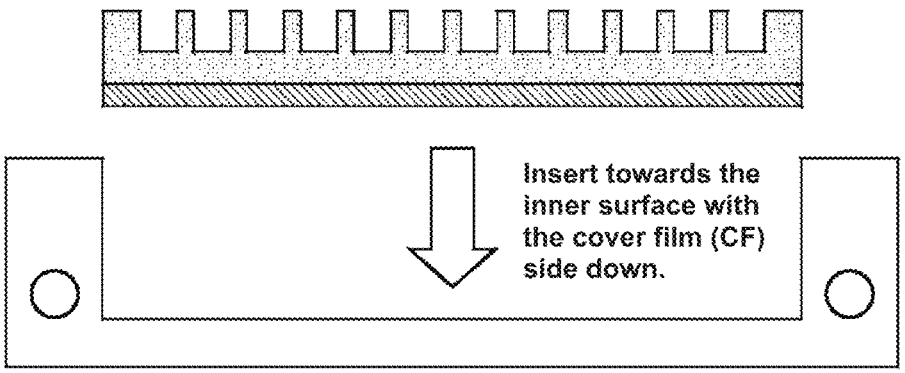
Insert towards the inner surface with the cover film (CF) side down.
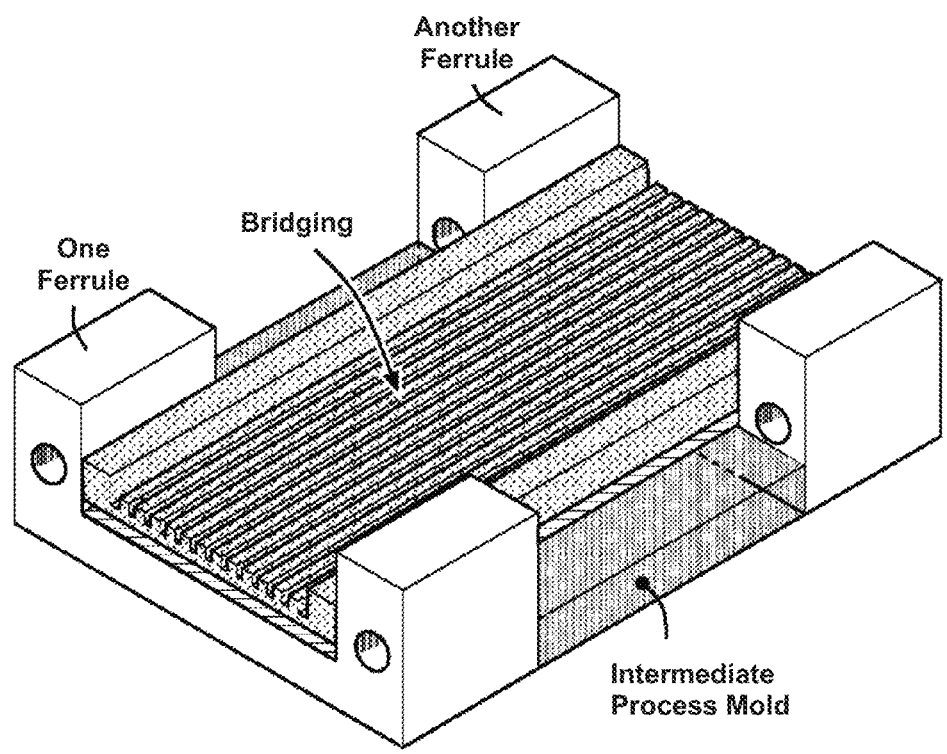

METHOD OF FORMING SINGLE-MODE POLYMER WAVEGUIDE ARRAY ASSEMBLY

RELATED APPLICATION DATA

This application is a Continuation application of co-pending U.S. patent application Ser. No. 13/953,336 filed on Jul. 29, 2013, incorporated herein by reference in its entirety.

TECHNICAL FIELD

The present invention relates to a method of forming a single-mode polymer waveguide array assembly and, more specifically, to a unique formation method whose purpose is to enable positioning of the plurality of cores constituting a polymer waveguide array with accuracy during connection of ferrules at the ends of the assembly.

BACKGROUND ART

Polymer waveguides have been attracting attention in the construction of optical communication systems. Compared to attempts to fix a plurality of fibers in parallel fashion in an array, more reliable assemblies can be formed at lower cost by forming a polymer waveguide array all at once in a process using a polymer material in a polymer waveguide.

FIG. 1 is a perspective view used to explain the configuration of a single-mode polymer waveguide array assembly.

A waveguide array assembly has a waveguide array and a plurality of ferrules attached to both ends. A ferrule functions as a type of connector. Because they usually have a standard shape and size, they are used according to standards. In order to simplify the explanation, the ferrules will only be shown schematically.

The waveguide array has a plurality of cores and cladding surrounding the cores. Each one of the cores can individually guide single-mode light from one ferrule to another ferrule.

FIG. 2 is a perspective view used to explain how two single-mode polymer waveguide array assemblies are connected.

Two single-mode polymer waveguide array assemblies are connected to each other via the ferrules attached to both ends of the assemblies. The ferrules function as a type of connector when the assemblies are connected.

By coupling a plurality of single-mode polymer waveguide array assemblies in this manner, a waveguide can be continuously expanded as an optical communication system is constructed or expanded.

In a typical example, as shown in FIG. 2 (A), two connected ferrules are secured by passing guide pins through guide pin holes provided in each ferrule.

In a typical example, the center of the guide pin holes are the absolute reference positions when two ferrules are connected to each other. However, the fixing method is not limited to this embodiment. If a different mechanical connection method is used, the configuration can be adapted to this difference. Therefore, the absolute reference position is not limited to this example, and can be in a different place.

Single-mode light is guided via each of the cores. Therefore, if the waveguides are to be continuously maintained when two ferrules are connected to each other, positioning accuracy between the cores is critical.

More specifically, in the connection plane (two-dimensional plane) between ferrules in FIG. 2 (B), it is critical to keep the deviation in the planar positioning (x, y) from the absolute reference position to the center of the core, that is, the δx error and δy error, within an acceptable range. (Usually, y=0 when a single-layer waveguide array is used.)

FIG. 3 is a graph showing the relationship between positioning deviation from an absolute reference portion and coupling loss in a polymer waveguide for multi-mode light.

The core scale (diameter) in a multi-mode light polymer waveguide is known to be much larger than the core size in a single-mode light polymer waveguide. This is because the function of guiding single-mode light only is related to the wavelength of the guided light, and theoretically, is directly related to the core (diameter).

The multi-mode light example is cited here for qualitatively descriptive purposes only. However, significant coupling loss is known to increase as the amount of positional deviation increases. In the graph, the horizontal axis indicates the offset and the units are μm (microns), whereas the vertical axis indicates the coupling loss and the units are dB (decibels).

The following is an explanation of the method used to read coupling loss with reference to the graph of FIG. 3. As indicated by the difference symbols used in the plot, the coupling loss depends on the size (0 μm-50 μm) of the gap created between the connection planes of two ferrules (in the depth direction relative to the (two-dimensional) ferrule connection planes in FIG. 2 (B)).

However, if the positioning error on the (two-dimensional) ferrule connection plane can be reduced to less than 5 μm in an ideal state in which the size of the gap has been suppressed to around 0 μm, a coupling loss reducible to less than 0.5 dB can be read.

However, even more stringent positioning accuracy is demanded when single-mode light is used. In theory, the positioning has to be at a very high level for the situation shown in FIG. 2 in which the positioning error is δx<0.5 μm-1.0 μm and δy<0.5 μm-1.0 μm. Otherwise, any positioning error leads directly to coupling loss.

Also, when the connection via ferrules is repeatedly extended, the coupling loss accumulates.

Patent Literature 1 discloses a manufacturing method for a resin-embedded waveguide element.

Patent Literature 2 discloses a waveguide mold and waveguide manufacturing method.

Patent Literature 3 discloses a stacked waveguide and manufacturing method for this stacked waveguide in which there are two or more light transmission paths, and any increase in crosstalk can be suppressed even when one of the transmission paths crosses another transmission path.

Patent Literature 4 discloses a manufacturing method for an optical waveguide array in which higher density integration can be achieved using a narrower pitch between optical waveguides.

Patent Literature 5 discloses an optical coupler able to achieve highly accurate alignment between a lens and optical waveguide using a simple configuration.

Patent Literature 6 discloses an optical waveguide component for easily connecting a multicore optical fiber and an optical element array with high density and low loss.

In Patent Literature 1-6, the problem addressed by the present invention is not addressed, which is to connect optical waveguide array assemblies with the very high accuracy demanded for single-mode light. Even an optical waveguide array assembly able to handle single-mode light has yet to be realized.

CITATION LIST

Patent Literature

Patent Literature 1 Laid-open Patent Publication No. 8-110433

Patent Literature 2 Laid-open Patent Publication No. 2004-133300

Patent Literature 3 Laid-open Patent Publication No. 2008-83205

Patent Literature 4 Laid-open Patent Publication No. 2005-201937

Patent Literature 5 Laid-open Patent Publication No. 2008-89879

Patent Literature 6 Laid-open Patent Publication No. 2000-75166

SUMMARY OF INVENTION

A purpose of the present invention is to be able to position with high accuracy the plurality of cores constituting a polymer waveguide array for connection to ferrules at the ends of a plurality of these assemblies in order to form a single-mode polymer waveguide array assembly.

In order to solve the problem associated with positioning cores with accuracy, the method of forming a single-mode polymer waveguide array assembly has been radically overhauled over the entire process. This is realized more specifically by the configuration described in detail below.

The present invention is thus able to obtain a single-mode polymer waveguide array assembly in which the plurality of cores constituting the polymer waveguide array can be positioned with high accuracy for connection to ferrules at the ends of a plurality of these assemblies.

Also provided is a combination of a plurality of process molds (an initial process mold and intermediate process mold) used in the plurality of processes unique to the method of the present invention.

BRIEF DESCRIPTION OF DRAWINGS

FIG. 2 is a perspective view used to explain how two single-mode polymer waveguide array assemblies are connected.

FIG. 5 corresponds to a view from the side (from the eye) in FIG. 4.

FIG. 6 is a perspective view used to explain the removal of the applied cover film (CF) and cured undercladding material together from the initial process mold.

FIG. 7 is a perspective view used to explain the provision of an intermediate process mold, the provision of a plurality of ferrules positioned at both ends of the intermediate process mold, and the bridging of the intermediate process mold and the ferrules provided at both ends with the removed applied cover film (CF) and cured undercladding material.

FIG. 8 corresponds to a view from the side (from the eye) in FIG. 4.

DETAILED DESCRIPTION OF EMBODIMENTS

Figure 4:
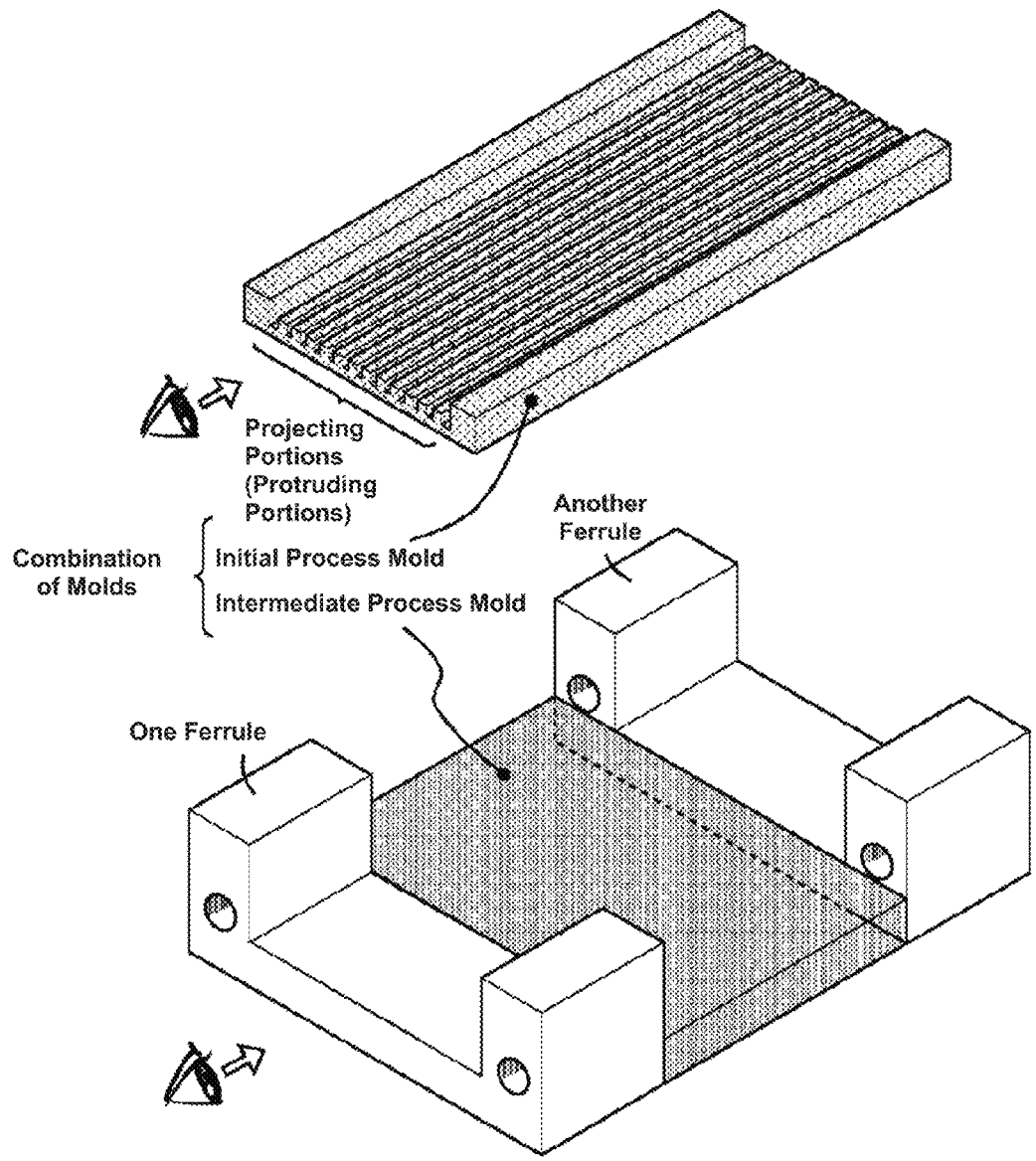
FIG. 4 is a perspective view used to explain the combination of a plurality of process molds used in a plurality of processes to form a single-mode polymer waveguide array assembly of the present invention.

FIG. 4 is a perspective view used to explain the combination of a plurality of process molds used in a plurality of processes to form a single-mode polymer waveguide array assembly of the present invention.

A single-mode polymer waveguide array assembly molded according to the molding method of the present invention has a waveguide array and a plurality of ferrules attached to both ends.

First, in the initial half of the process, an initial process mold is provided in which a plurality of projecting portions (protruding portions) are prepared on each inner surface and correspond to each core in the waveguide array.

Next, in the latter (intermediate) half of the process, an intermediate process mold is provided, and a plurality of ferrules (one ferrule and another ferrule) are positioned at both ends of the intermediate process mold.

These molds play an important role in the process of the unique molding method of the present invention.

Figure 5:
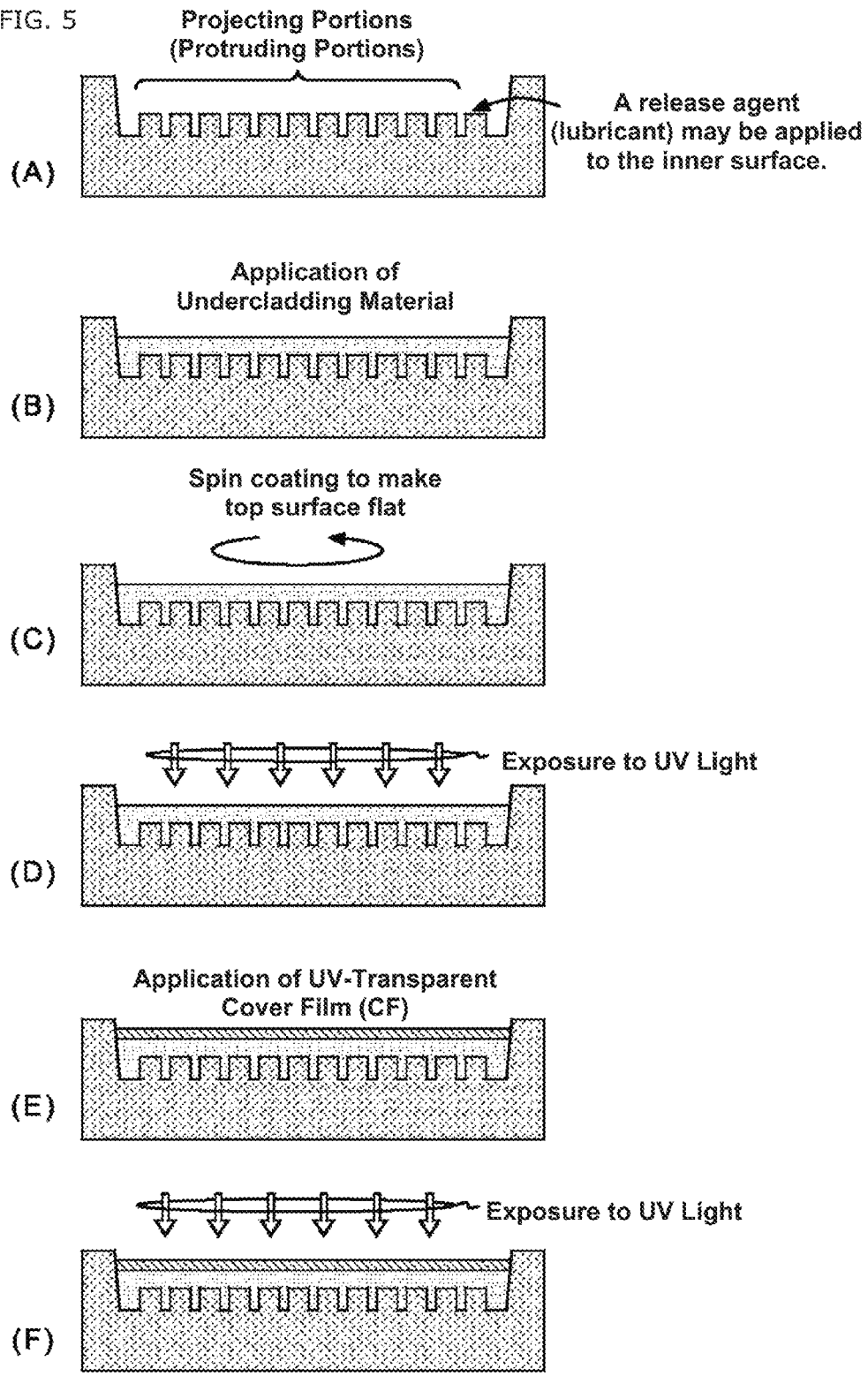
FIG. 5 is a schematic diagram used to explain a portion of the process of the present invention using the initial process mold.

FIG. 5 is a schematic diagram used to explain a portion of the process of the present invention using the initial process mold. FIG. 5 corresponds to a view from the side (from the eye) in FIG. 4.

In FIG. 5 (A), an initial process mold is provided in which a plurality of projecting portions (protruding portions) has been prepared on an inner surface. These projecting portions correspond to each of the plurality of cores in the waveguide array. This mold is designed so that the side faces viewed by the eye in FIG. 4 are tapered so as to open upward on the inside of the (two) high embankments on both ends. This makes the mold easier to remove later.

After the initial processing mold has been provided, a release agent (lubricant) may be applied to the inner surface of the initial process mold (to make the mold easier to remove later).

In FIG. 5 (B), an undercladding material is applied to the inner surface of the initial process mold to cover the plurality of projecting portions (protruding portions).

In FIG. 5 (C), the applied undercladding material is spin coated. This spin coating controls the height of the material and flattens the top surface of the material. This process is critical to adjusting the δy error in FIG. 2 (that is, improve accuracy). From this perspective, spin coating is an effective processing method.

In FIG. 5 (D), the undercladding material is UV-cured by exposing the undercladding material to UV light. This process is stopped at a level sufficient for the subsequent processes, or at a sufficient (semi-cured) hardness for the subsequent processes. In other words, the undercladding retains enough hardness that the weight of the cover film (CF) applied in FIG. 5 (E) does not change the thickness of the undercladding layer, and the cover film (CF) and undercladding layer are bonded to each other by the UV exposure in FIG. 5 (F). This process may be omitted, depending on the properties of the material being used.

In FIG. 5 (E), a UV-transparent cover film (CF) is applied to the top surface of the flattened undercladding material. The UV-transparent cover film (CF) can be any commercially available product of uniform thickness.

In FIG. 5 (F), the undercladding material is UV-cured by exposing the undercladding material to UV light via the applied cover film (CF). By fully curing the undercladding material, the plurality of projecting portions (protruding portions) prepared in the inner surface of the initial process take (assume) the proper form. The cover film (CF) and the undercladding layer are also bonded to each other.

FIG. 6 is a perspective view used to explain the removal of the applied cover film (CF) and cured undercladding material together from the initial process mold.

FIG. 7 is a perspective view used to explain the provision of an intermediate process mold, the provision of a plurality of ferrules positioned at both ends of the intermediate process mold, and the bridging of the intermediate process mold and the ferrules provided at both ends with the removed applied cover film (CF) and cured undercladding material.

An intermediate process mold is provided, and a plurality of ferrules is positioned on both ends of the intermediate process mold. The intermediate process mold may be inserted last to ensure that the intermediate process mold bridges the ferrules positioned on both ends (with respect to the inner surface of the ferrules at both ends).

During bridging, the applied cover film (CF) side is inserted face down towards the inner surfaces of the ferrules. The intermediate process mold can then function as a support structure.

The applied cover film (CF) may be bonded to one of the ferrules in this state. The applied cover film (CF) may also be bonded to the other ferrule. During bonding, the intermediate process mold may be used as a positioning tool to ensure that the bonding is performed with accuracy. The intermediate process mold can perform a critical role in ensuring bonding position accuracy because it reduces the gap mentioned earlier.

Figure 8:
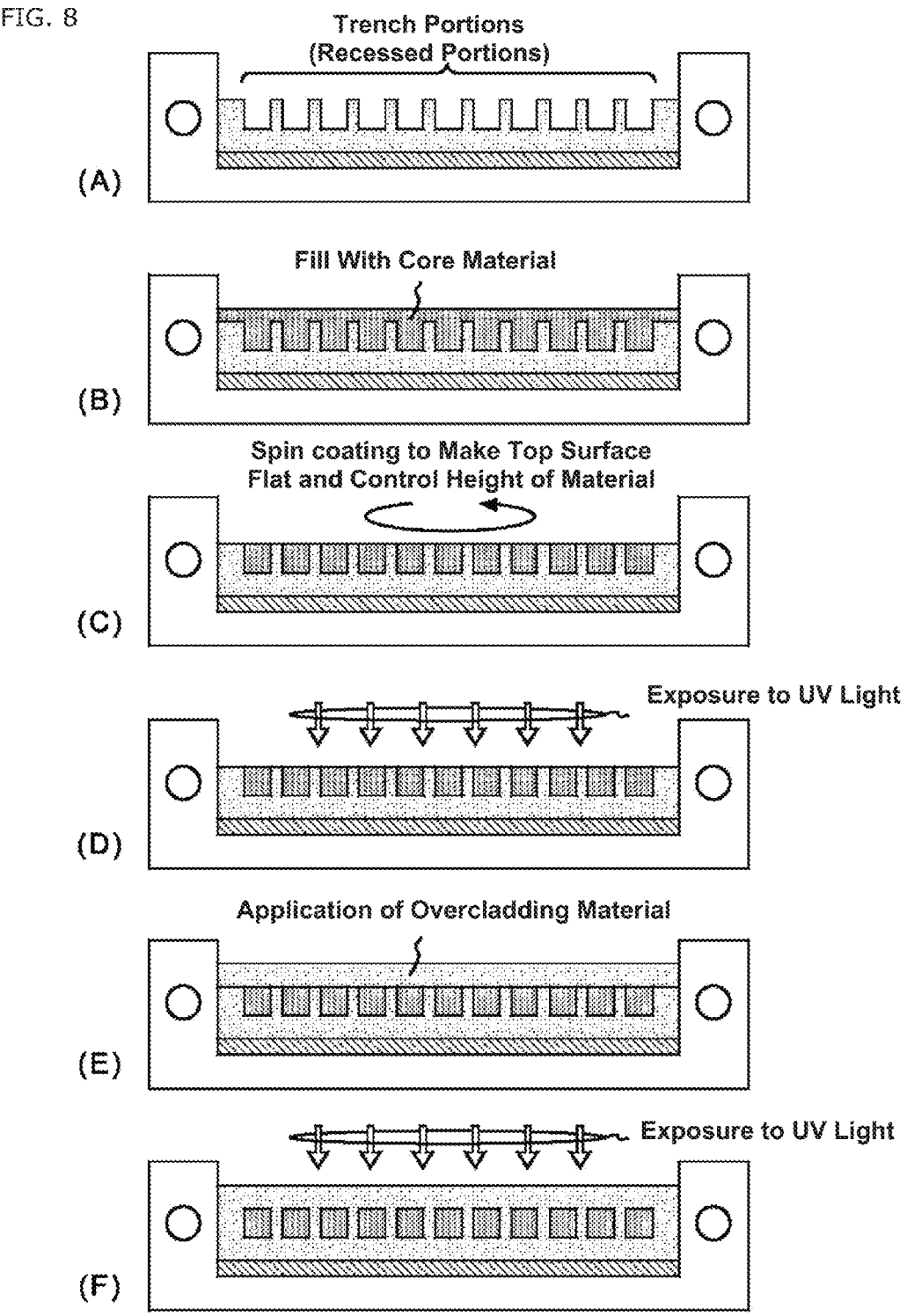
FIG. 8 is a schematic diagram used to explain a portion of the process of the present invention using a plurality of ferrules (one ferrule and another ferrule) and the intermediate process mold.

FIG. 8 is a schematic diagram used to explain a portion of the process of the present invention using the intermediate process mold. FIG. 8 corresponds to a view from the side (from the eye) in FIG. 4.

As shown in FIG. 8 (A), a plurality of trench portions (recessed portions) are formed according to the (mold) form of the plurality of projecting portions (protruding portions).

In FIG. 8 (B), the plurality of trench portions (recessed portions) of cured undercladding material are filled with core material. As shown in the drawing, the trench portions should be filled with an adequate amount of core material.

Care should be exercised to spread the core material in the plurality of trench portions (recessed portions) so that there are no gaps (voids) between the core and cladding.

In FIG. 8 (C), the filled core material is spin coated. The spin coating controls the height of the core material, flattens the top surface of the material, and fills the trench portions (recessed portions) with core material up to the upper ends. Any excess core material is removed in this step.

Because light is propagated by reflection at the boundary between the core and cladding functioning as the waveguide, spin coating is effective as the critical process of defining the boundary with the core by (accurately) adjusting the position of the core and cladding in the y direction in FIG. 2.

In FIG. 8 (D), the core material is cured by exposing the core material to UV light.

In FIG. 8 (E), overcladding material is applied on top of the cured core material and cured undercladding material. The overcladding material is preferably the same as the undercladding material or a material with the same refractive index (optical properties). It should also be compatible with the undercladding material after curing.

In FIG. 8 (F), the applied overcladding material is cured.

Figure 9:
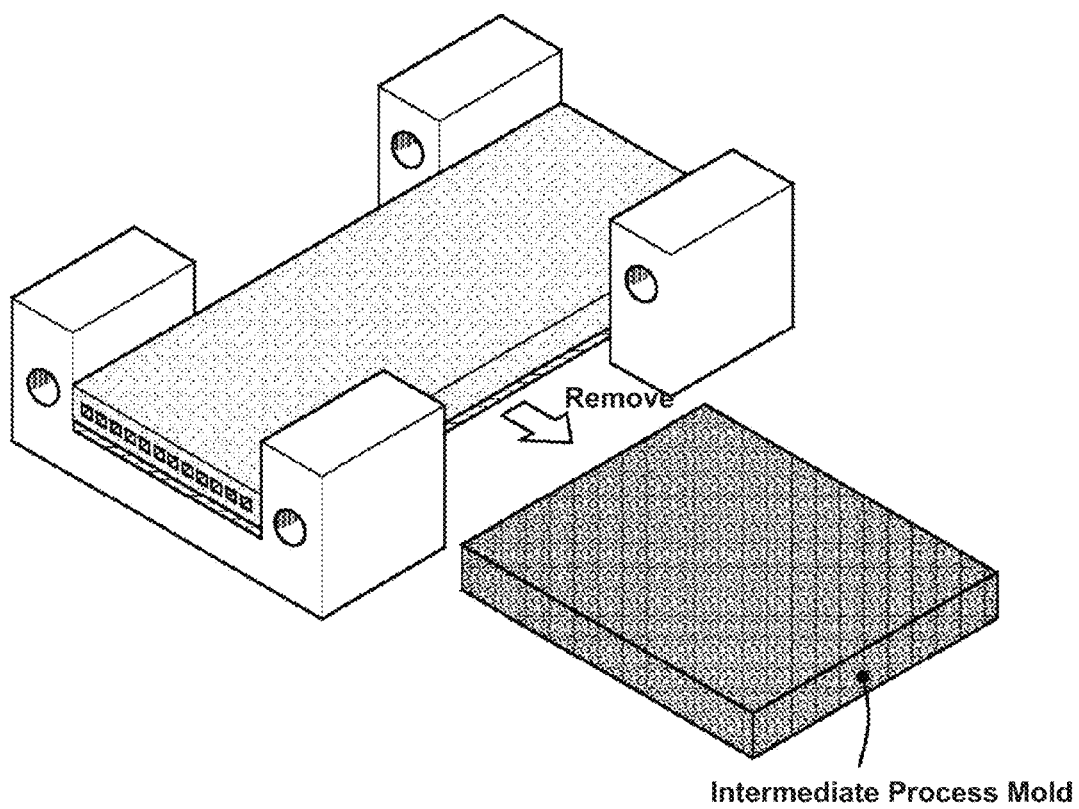
FIG. 9 is a perspective view used to explain the removal of the intermediate process mold from the molded waveguide array.

FIG. 9 is a perspective view used to explain the removal of the intermediate process mold from the molded waveguide array.

After the processes through FIG. 8 (F) have been completed, the applied cover film (CF) may be bonded to the one ferrule and/or the other ferrule.

In this way, a single-mode light polymer waveguide array assembly is formed according the unique processes of the present invention.

In the quartz fiber MT standards (IEC 1754-5 1996 and JIS C 05981 1998), the number of cores is defined as 2, 4, 8, 10, 12, (and 16), and in the polymer waveguide MT standards (JPCA PE03-01-07S 2006), the number of cores is defined as 8 and 12.

Figure 1:
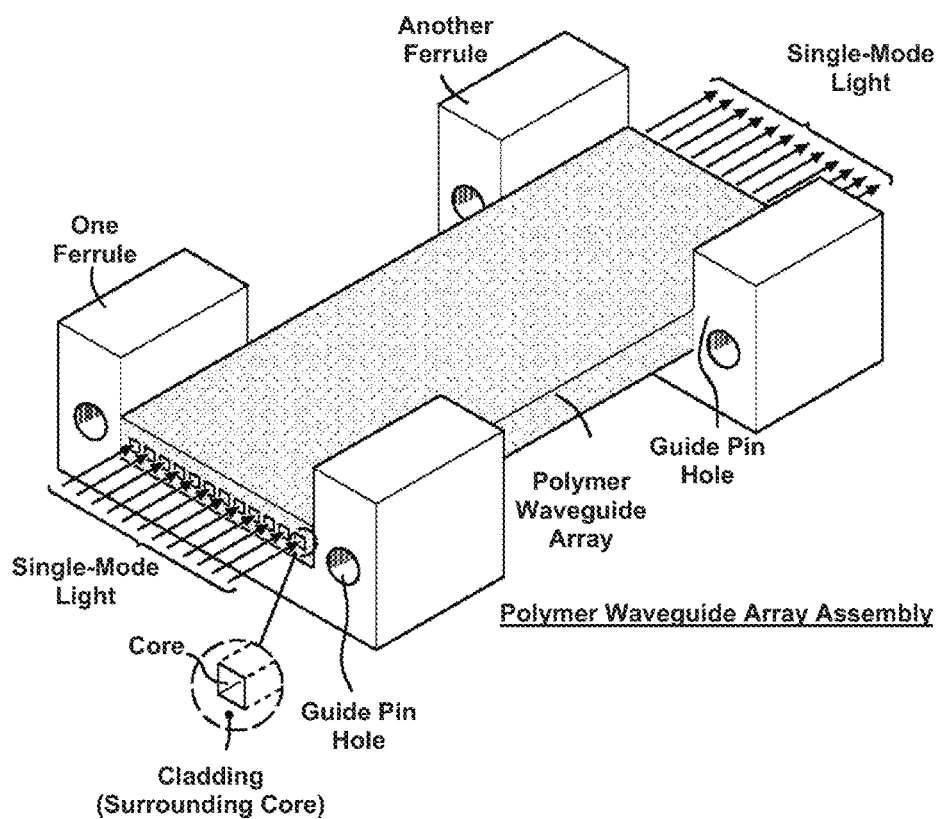
FIG. 1 is a perspective view used to explain the configuration of a single-mode polymer waveguide array assembly.
Figure 3:
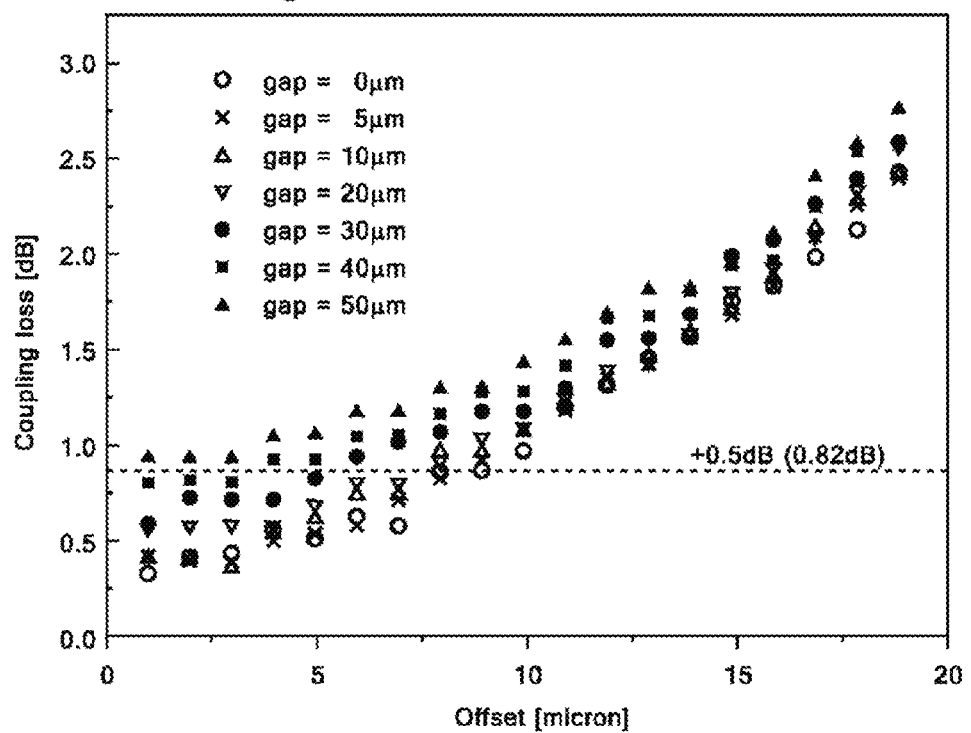
FIG. 3 is a graph showing the relationship between positioning deviation from an absolute reference portion and coupling loss in a polymer waveguide for multi-mode light.

The number of cores in FIG. 1, FIG. 2 (b) and FIG. 9 is 11 or 12 in accordance with the protruding portions of the initial mold in FIG. 4 and FIG. 5, and the recessed portions in FIG. 6, FIG. 7 and FIG. 8. However, as long as there is a plurality, the number can be broadened when applying the technical concept of the present invention. Thus, the number should not be construed as being specified or limited.

What is claimed is:

1. A method of forming a single-mode polymer waveguide array assembly, the method comprising the steps of:
    applying an undercladding material to cover a plurality of projecting portions prepared on an inner surface of an initial process mold, said projecting portions each corresponding to one of a plurality of cores in a waveguide array;
    applying ultraviolet (UV)-transparent cover film to the top surface of the undercladding material;
    exposing the undercladding material to UV light via the applied cover film to UV-cure the undercladding material and bond the cover film to the undercladding material;
    removing the applied cover film and cured undercladding material together from the initial process mold;
    bridging an intermediate process mold and a plurality of ferrules provided at both ends of the intermediate process mold with the removed applied cover film and cured undercladding material, these being inserted toward a plurality of inner faces of the plurality of ferrules with the applied cover film side facing down;
    filling a plurality of trench or recessed portions of the cured undercladding material with a core material;
    exposing the core material to UV-light to cure the core material;
    applying an overcladding material to the cured core material and cured undercladding material; and
    curing the applied overcladding material.

2. A method according to claim 1 further comprising the steps of:
    providing the initial process mold designed for easy removal by tapering an inner surface of the initial process mold; and
    applying a release agent to the inner surface of the initial process mold.

3. A method according to claim 1, wherein a height of the plurality of cores from a center of the intermediate mold and a height of the plurality of cores from the center in each of the ferrules at both ends are set to a same height with an accuracy from about 0.5 μm to about 1 μm from the center of the guide pins of the ferrules at both ends to an absolute reference position.

4. A method according to claim 1, wherein the step of positioning the plurality of ferrules at both ends of the intermediate process mold are performed so the intermediate process mold bridges in advance the plurality of ferrules positioned on both ends with respect to an inner surface of the plurality of ferrules on both ends.

5. The method according to claim 1, wherein the intermediate process mold has a length that is a difference between a length of the waveguide array and twice a length of one of the plurality of ferrules, wherein the plurality of ferrules all have a same length.

6. A method of forming a single-mode polymer waveguide array assembly, comprising:
applying an undercladding material to cover a plurality of projecting portions prepared on an inner surface of an initial process mold, said projecting portions each corresponding to one of a plurality of cores in a waveguide array;
applying ultraviolet (UV)-transparent cover film to a top surface of the undercladding material;
exposing the undercladding material to UV light via the applied cover film to UV-cure the undercladding material and bond the cover film to the undercladding material;
removing the applied cover film and cured undercladding material together from the initial process mold;
positioning a plurality of ferrules at both ends of an intermediate process mold;
bridging the intermediate process mold and the plurality of ferrules provided at both ends with the removed applied cover film and cured undercladding material, these being inserted toward a plurality of inner faces of the plurality of ferrules with the applied cover film side facing down;
filling a plurality of trench or recessed portions of the cured undercladding material with a core material;
exposing the core material to UV-light to cure the core material;
applying an overcladding material to the cured core material and cured undercladding material;
curing the applied overcladding material; and
removing the intermediate process mold from between the plurality of ferrules.

7. A method according to claim 6 further comprising the steps of:
providing the initial process mold designed for easy removal by tapering an inner surface of the initial process mold; and
applying a release agent to the inner surface of the initial process mold.

8. A method according to claim 6, wherein a height of the plurality of cores from a center of the intermediate mold and a height of the plurality of cores from the center in each of the ferrules at both ends are set to a same height with an accuracy from about 0.5 µm to about 1 µm from the center of the guide pins of the ferrules at both ends to an absolute reference position.

9. A method according to claim 6, wherein the step of positioning the plurality of ferrules at both ends of the intermediate process mold is performed so the intermediate process mold bridges in advance the plurality of ferrules positioned on both ends with respect to an inner surface of the plurality of ferrules on both ends.

10. The method according to claim 6, wherein the intermediate process mold has a length that is a difference between a length of the waveguide array and twice a length of one of the plurality of ferrules, wherein the plurality of ferrules all have a same length.

* * * * *